Dec. 8, 1959
L. K. SWENSON
2,916,355
METHOD OF REMOVING MONOVALENT BASE IONS
FROM SULFITE PULPING LIQUORS
Filed Nov. 16, 1955
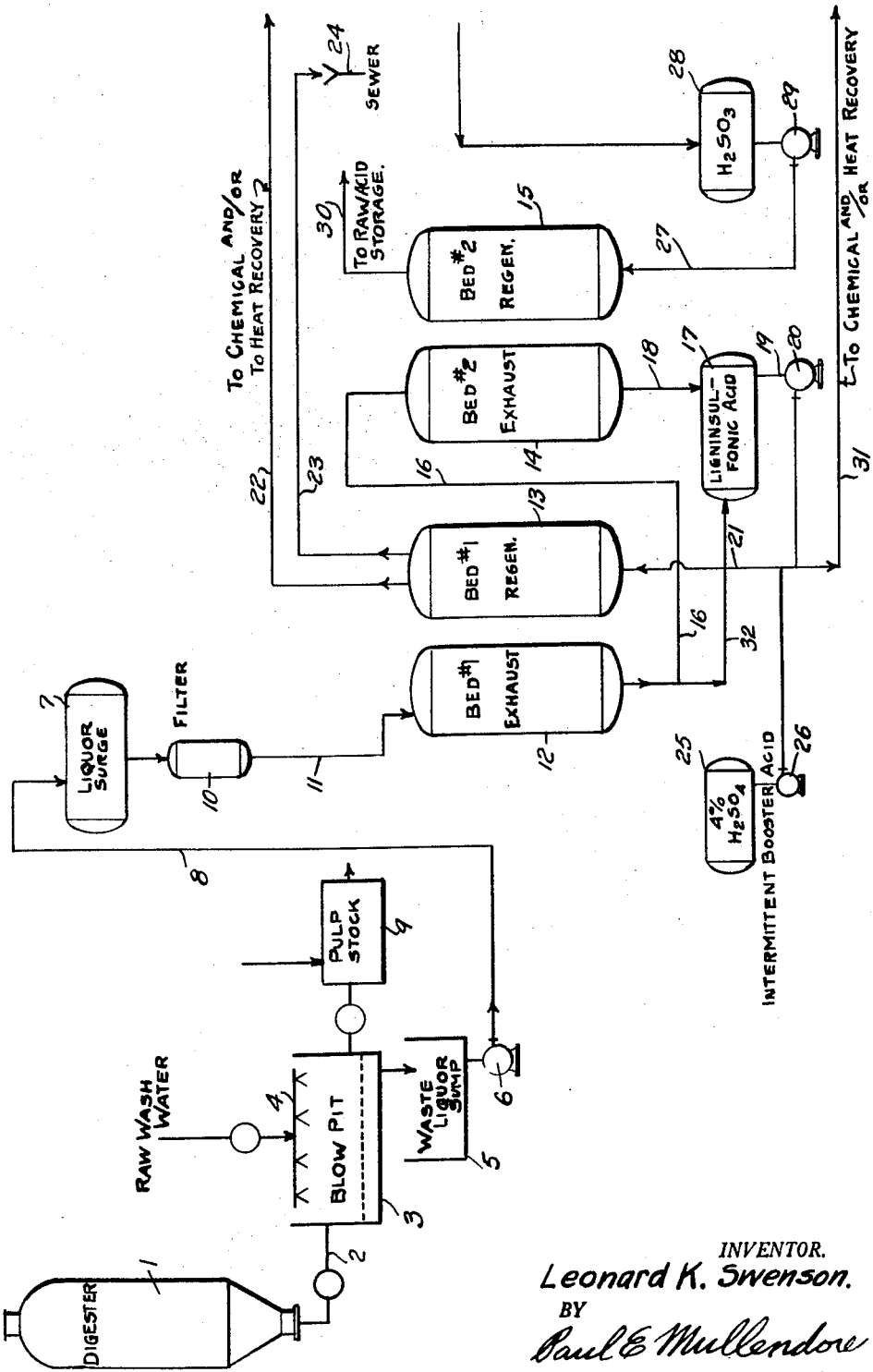
INVENTOR.
Leonard K. Swenson.
BY
Paul E. Mullendore
ATTORNEY

United States Patent Office 2,916,355
Patented Dec. 8, 1959

2,916,355

METHOD OF REMOVING MONOVALENT BASE IONS FROM SULFITE PULPING LIQUORS

Leonard K. Swenson, Kansas City, Mo., assignor to J. F. Pritchard & Company, Kansas City, Mo., a corporation of Missouri Application November 16, 1955, Serial No. 547,098

9 Claims. (Cl. 23—129)

This invention relates to a process to recover ammonia from ammonium base sulfite pulping liquors and to provide a liquor product substantially free of undesirable contaminants such as metallic cations.

It is well known that the ammonia base sulfite pulping process has many advantages and is desirable in preparing pulp stock for the manufacture of paper and similar products, however, the high cost of ammonia and the ultimate waste thereof because of difficulties involved in its recovery has retarded changeover to the ammonia base sulfite process.

It has been proposed to remove the ammonia from the waste ammonium base sulfite liquor by passing the waste liquor through a cation exchanger wherein ammonium ions replace the hydrogen ions of the exchanger. The effluent liquor is then to be treated for recovery of heat and/or chemicals and the ammonia is removed from the exchanger by regeneration with sulfurous acid to form a raw acid which is subsequently used in the ammonium base pulping process. In one of the proposed processes, the cation exchanger is produced from the waste liquor itself, and in other proposed processes, the cation exchanger may be one of the cation exchange resins, such as copolymers of styrene containing strongly acidic nuclear-sulfonic acid exchange groups, now commercially manufactured for various hydrogen ion exchange processes.

It has heretofore been known that wood, commercially supplied water and certain pulping chemicals contain a relatively small percentage of inorganic substances, but the effect these compositions have an monovalent cation recovery operations has not heretofore been fully appreciated, nor a satisfactory method provided for preventing such contaminants from lowering the efficiency of the recovery process. Wood of the type normally utilized in pulping operations contains approximately 0.3% by weight of ash and thus, in the manufacture of 1 ton of pulp requiring approximately 2 tons of wood, over 12 pounds of ash is introduced into the pulping system and which is composed principally of calcium but contains other multivalent cations such as magnesium, iron and manganese, as well as a certain proportion of monovalent cations in the nature of sodium and potassium. Also, the commercially supplied water used in the manufacture of 1 ton of pulp amounts to approximately 2,000 gallons per ton and, at a median hardness of approximately 100 parts per million, this quantity of water contains about 1.7 pounds of additional inorganic materials, mainly of the multivalent cation type such as calcium and magnesium.

The ions of the bases in the sulfite liquor become affixed on the exchanger and the available capacity of the cation exchanger for the ions of ammonia and other desirable monovalent bases is rapidly and progressively reduced by ions of the other bases such as calcium and magnesium, with the result that ions of the monovalent bases leak after a short operating period and are lost. Also when the exchanger is regenerated, the multivalent ions are released along with the ammonium ion into the regenerating acid with the result that these multivalent ions appear in the ammonium bisulfite product as contaminants. Furthermore, the multivalent ions are more firmly held by the cation exchanger and reduce the capacity of the exchanger for monovalent ions. Also, the regeneration of the cation exchanger is more difficult for multivalent ions, requiring more acid of higher strength.

It is therefore a principal object of the present invention to provide a process for treating ammonium-base sulfite pulping liquors so as to obtain optimum efficiency of the cation exchanger and eliminate contamination of the ultimate ammonium product with multivalent ions such as calcium.

A further object of the invention is to provide a multistep ion exchange recovery process having steps which operate to avoid loss of the ammonia and other valuable components of the waste liquor.

Another object of the invention is to utilize the waste ligninsulfonic acid effluent after ammonium ions have been exchanged for hydrogen ions in the second exchange step, as the regenerating acid for regenerating the cation exchanger in the first exchange step, and to remove the bases as salts of ligninsulfonic acid so as to restore simultaneously the exchanger of the first step to the hydrogen form.

Another object of the invention is to provide a two-step ion exchange for recovery of other monovalent bases in purified form, such as sodium and potassium.

Another object of the invention is to remove solids from the cation exchanger beds that interfere with optimum action of the exchangers and to remove such solids without loss of desirable chemicals or causing any substantial increase of liquid in the system.

Another object of the invention is to use other acids to fortify the ligninsulfonic acid in regenerating the ion exchanger of the first step and thereby maintain high capacity of the cation exchanger for multivalent ions, thereby providing for longer operating periods between regenerating cycles.

In accomplishing these and other objects of the invention I have provided improved methods involving the use of an apparatus represented in the accompanying drawing, wherein the single figure is a simplified diagrammatic view of a form of the apparatus by which my improved process is carried out.

Referring more in detail to the drawing:

1 designates a digester wherein wood chips are cooked in an ammonia base sulfite liquor to produce a pulp. The pulp is discharged from the digester through a line 2 into a blow pit 3 where it is washed with raw water, for example, through a spray 4. The waste liquor and wash water are discharged from the bottom of the blow pit into a sump 5 from which the waste liquor is withdrawn by a pump 6 and discharged to a surge vessel 7 through a pipe 8. The pulp is discharged from the blow pit to pulp stock 9.

The liquor which is delivered to the vessel 7 contains the ammonia and other desirable bases along with undesirable or unwanted bases, wood particles and other materials that were washed from the pulp, and constitutes the waste ammonium sulfite liquor to be treated in accordance with the present invention for recovery of the ammonia and other valuable elements contained therein. The waste liquor is discharged from the surge vessel into a filter 10 which removes most of the solids so that the liquor discharged from the filter through a pipe 11 is substantially free of wood particles and those solids capable of being stopped in the filter. As above stated, the present invention contemplates removal of the ammonia and other desirable base elements through hydrogen ion exchange on a cation exchanger and which after substantial exhaustion is adapted to be regenerated for further use. Therefore to provide a continuous process the apparatus comprises at least two vessels 12 and 13, each containing a bed of ion exchange resin, such as a copolymer of styrene containing a strongly acidic nuclear-sulfonic acid exchange group, whereby the bed in one vessel may be regenerated while the other bed is being exhausted. For simplicity, the flow lines are shown in connection with the vessels 12 and 13 so that the vessel 12 is in the exhaust cycle and the vessel 13 is in the regenerating cycle.

Associated with the vessels 12 and 13 are vessels 14 and 15 for containing additional beds of a cation exchanger designated bed #2 to carry on the exhaustion and regenerating cycles of the second of the ion exchange recovery processes in accordance with the present invention. The connections with the vessels 14 and 15 are such that the vessel 14 is illustrated in the exhaust cycle and the vessel 15 in the regenerating cycle. However, it is to be understood that the vessels are connected by headers so that either one of each set 12 or 13 and 14 or 15 may be operated on the exhaust cycle while the other is operating on the regenerating cycle. In actual practice each set will comprise a battery of vessels connected by headers (not shown) so that one or more may be in the exhaust cycle while the others of that battery are in the regenerating cycle.

In the diagram the lower portion of the vessel 12 is shown as connected with the upper portion of the vessel 14 by a duct 16 and the lower portion of the vessel 14 is connected with a vessel 17 for receiving the effluent from that vessel through a duct 18 and which in turn is connected by a duct 19 with a pump 20 discharging through a duct 21 into the lower portion of the vessel 13. The upper portion of the vessel 13 is shown as connected with discharge ducts 22 and 23, the line 22 leading to a place of heat recovery and the line 23 to a sewer connection indicated at 24. Connected with the duct 21 near the bottom of the vessel 13 is a storage vessel 25 for containing a booster acid which is discharged through the duct 21 into the vessel 13 under pressure of a pump 26. The bottom of the vessel 15 is connected with a duct 27 leading from a storage vessel 28 by which a regenerating medium such as sulfurous acid is discharged under the pressure of a pump 29 into the lower portion of the vessel 15. Effluent is removed from the top of the vessel 15 and conveyed through a duct 30 to storage for use as part of the ammonium bisulfite cooking acid used in the pulping process. Excess of ligninsulfonic acid is removed from the vessel 17 and conducted to a chemical and/or heat recovery plant through a duct 31.

In operating the apparatus in accordance with the present invention, it is assumed that the bed #1 in the vessel 12 has been regenerated in hydrogen form, rinsed and ready for exhaustion.

*Exhaust*

The first step of the preferred process is to pass filtered sulfite liquor from the filter 10 in downflow through a bed #1, for example in the vessel 12, into exchange with the cation exchanger therein so that all multivalent base ions are quantitatively held and monovalent base ions are retained until the capacity of the bed is approached. Since all of the base ions are initially retained by the cation exchanger, the effluent is discharged at the bottom of the vessel through suitable header connections (not shown) and directed through conduit 32 to vessel 17. The approach to the capacity of the bed #1 for the ammonium ions may be noted when the ammonium ions begin to leak through with the effluent. The time of this leakage can be detected by any of several methods, such as a slight rise in the pH of the effluent, chemical analysis, change in electrical conductivity, or absorption spectroscopy. An alternate process would be to pass the decationed effluent to bed #2 in the vessel 14, but this would necessitate handling a greater amount of liquid in bed #2 than necessary.

When it is noted that the ammonium ions start to leak, the next step begins by directing the effluent from the vessel 12 through the duct 16 into the upper portion of the vessel 14. The downflow of filtered waste sulfite liquor is continued through the bed #1 as in the first step and the effluent containing the base ions that leak from the bed #1 is now fed to bed #2 in the vessel 14. The effluent from bed #1 will increase in ammonium ion leakage until the original ammonium ion concentration is equalled or exceeded. pH continues to rise with increasing leakage. The effluent from the vessel 12 passes in downflow through the bed #2 in the vessel 14 and its effluent is discharged to the storage vessel 17. The ammonium ions and ions from other monovalent bases are exchanged in the bed #2 with the hydrogen ions and are thereby removed from the effluent passing to the storage vessel 17. Exhaustion of the hydrogen from the exchanger beds #1 and #2 produces an acidic effluent of various compositions essentially known as ligninsulfonic acid. Any multivalent ions leaking from bed #1 will be quantitatively retained in bed #2. When more than two-thirds of the total capacity of the bed #1 in vessel 12 has been exceeded, calculated on the basis of multivalent ions only, magnesium and/or calcium ions start leaking from the bed #1, and the exhaustion of bed #1 in vessel 12 is discontinued. The bed #1 in vessel 12 must now be placed on the regenerating cycle as later to be described. Ammonium ions will first start leaking in quantity from the bed #2 in vessel 14 and since such leakage is lost from the system and potential recovery, the exhaustion of bed #2 in vessel 14 is stopped at the first detectable leakage. Detection can be made by such methods as change in pH, change in electrical conductivity, or absorption spectroscopy. The flow of effluent from the first exchange step in bed #1 may then be shifted to another of the vessels in the battery of bed #2 to provide a continuous ion exchange process.

*Regeneration of #1 beds*

The ligninsulfonic acid collected in the vessel 17 is suitable for regeneration of beds #1. Ligninsulfonic acid is pumped from vessel 17 through the ducts 19 and 21 by the pump 20 for upflow through a bed #1 to be regenerated, for example as illustrated in connection with the vessel 13 in the drawing. Preferably the unexchanged liquid capacity of the bed #1 remaining in vessel 13 is permitted to back flow from the liquid at the top either into another vessel having a bed #1 in the exhaustion cycle thereof or it may be recycled to the liquor surge vessel 7. The purpose is to purge unexchanged liquor from the vessel 13 without loss of any desirable base ions. The pH of the effluent from vessel 13 will rise when purging nears completion. Hydrogen ions of the ligninsulfonic acid are displaced by the base ions in the bed #1 under regeneration and the effluent now contains the bases and is discharged to the sewer connection 24 through the duct 23. The initial effluent is wasted to sewer because the high percentage of multivalent ions, principally calcium ions, would make recovery of chemicals or waste disposal by evaporation difficult. If evaporation facilities are employed for recovery of chemicals or waste disposal the effluent may be discharged to the waste liquor evaporators through the duct 22 after the calcium concentration has been reduced to a tolerable level by disposal of the initial flow to the sewer. A considerable excess of ligninsulfonic acid produced as effluent from bed #2 is available over the amount required for regeneration of beds #1. Continued passage of all available excess acid through bed #1 will continue to regenerate and restore capacity by removal of multivalent ions. In the preparation of bisulfite cooking acid, sulfur is burned to sulfur dioxide and a small quantity is oxidized to sulfur trioxide. Sulfur trioxide is undesirable in the cooking acid and may be removed by water scrubbing at a temperature in excess of 150° F. A 5% to 10% solution of sulfuric acid is obtainable without appreciable loss of sulfur dioxide in the hot scrubbing water. This acid is frequently wasted to sewer, but in the present process is delivered to the vessel 25 to be used to fortify the ligninsulfonic acid and is preferably introduced near the end of the regeneration cycle. After the bed #1 in vessel 13 has been regenerated it is again ready to begin an exhaustion cycle as described for bed #1 in vessel 12.

*Regeneration of #2 beds*

Sulfurous acid from the storage vessel 28 is pumped by the pump 29 through the duct 27 for upflow through the bed #2 to be regenerated as indicated in the vessel 15 of the drawing. The flow is preferably at sufficient rate to expand the bed 10% to 20%, and to simultaneously back wash the bed #2. A 2% to 3% solution of $SO_2$ in the water will adequately regenerate the beds #2 by virtue of the large excess of sulfurous acid available for this purpose. Periodic regeneration of bed #2 with a strong mineral acid will restore the bed efficiency for monovalent ions. Part of the ligninsulfonic acid could also be used to regenerate the beds #2 by an occasional interchange of the functions of the beds #1 and #2, bed #2 becoming bed #1 and vice versa. The effluent or raw ammonium bisulfite cooking acid after passing through the bed #1 in vessel 15 and picking up principally the ammonium and lesser amounts of other monovalent base ions is discharged to storage through the duct 30 and further prepared for use in the digester vessel 1. The excess of the ligninsulfonic acid essentially free of cations may be drawn off through a duct 31 that is connected with the vessel 17 through the duct 21 and passed to the chemical and/or heat recovery system, not shown.

*Backwashing of cation exchanger beds*

It is desirable to back wash and effect hydraulic classification of the beds #1. Back washing removes any solids which may be formed in or trapped by the cation exchanger thus maintaining uniform flow through the cation exchanger during the exhaustion step. The extent of this back washing and the sequence of such steps is not critical. If back washing with raw water occurs after regeneration, the raw water will be stripped of all cations and results in a loss of exchanger bed capacity unless the same back wash water is utilized for washing pulp such as in the blow pit 3. Excessive washing in this manner should be avoided as it would ultimately dilute the strength of the ligninsulfonic acid effluent in vessel 17, waste water, and increase the volume of ligninsulfonic acid liquor to be handled by evaporators in a chemical and/or heat recovery system, not shown. A preferred procedure is back washing by upflow with filtered sulfite liquor from a connection (not shown) to duct 11 at a flow rate sufficient to expand the cation exchanger bed 20% to 50%. The washings are recycled through a duct (not shown) to the sulfite liquor surge vessel 7, to be processed subsequently with the sulfite waste liquor from waste liquor sump 5. Back washing in such a manner will also cause a greater saturation of bed #1 with multivalent cations. Monovalent cations, such as ammonium, thereby exchanged will be recycled to liquor surge vessel 7 without loss from the waste sulfite liquor. The capacity of bed #1 for multivalent cations can be thus fully attained without risk of multivalent cation leakage into bed #2 or loss of valuable monovalent cations to the sewer through duct 23 during initial regeneration of a bed #1 which may be incompletely saturated with multivalent cations. The waste liquor unexchanged in the ion exchanger bed #1 at the conclusion of this back washing step is preferably purged into the liquor surge vessel 7 by displacement with ligninsulfonic acid from vessel 17 through duct 21.

The beds #2 are also preferably back washed. The liquor to bed #2 has passed through the filter and bed #1 and therefore bed #2 should be free of solid material; however, chemical action with changing pH can produce less soluble materials so that a washing and hydraulic classification step is desirable. This washing and hydraulic classification is best accomplished simultaneous with regeneration by the sulfurous acid from vessel 28. Solid material flushed from bed #2 may be harmlessly returned to the pulping process by means of duct 30 along with the raw ammonium bisulfite cooking acid.

What I claim and desire to secure by Letters Patent is:

1. An ion exchange method of treating the waste lignosulfonate liquor resulting from monovalent sulfite pulping of wood for selectively separating said monovalent cations from multivalent cations contained in the same comprising the steps of passing waste lignosulfonate liquor through a first ion exchange resin initially substantially saturated with hydrogen ions to effect interchange of cations in the waste liquor for said hydrogen ions on the first resin and until monovalent cations commence to leak from the first resin with the effluent therefrom; then directing the effluent from said first resin and containing said monovalent cations therein through a second ion exchange resin initially substantially saturated with hydrogen ions to effect preferential interchange of said monovalent cations in the effluent from the first resin for said hydrogen ions on the second resin and until a significant proportion of multivalent cations begin to leak with said effluent from the first resin; collecting the ligninsulfonic acid effluent emerging from said second resin until a significant amount of said monovalent cations begin to leak therefrom with said ligninsulfonic acid effluent; passing the ligninsulfonic acid effluent collected from said second resin through said first resin upon cessation of passage of said waste ligninsulfonate liquor through the same to effect interchange of hydrogen ions in said ligninsulfonic acid effluent for monovalent and multivalent cations on the first resin and thereby regenerating the latter; and passing a solution containing sulfurous acid through the second resin upon cessation of passage of said effluent from the first resin through the same to effect interchange of hydrogen ions in the sulfurous acid for said monovalent cations on the second resin and thereby simultaneously regenerating the latter and producing a fresh monovalent sulfite cooking liquor.

2. An ion exchange method as set forth in claim 1 wherein the effluent from said first resin prior to the commencement of leakage of monovalent ions from said first resin is collected with the ligninsulfonic acid effluent from the second resin prior to passage of the same through said first resin to regenerate the latter.

3. An ion exchange method as set forth in claim 1 wherein said steps include passing the lignosulfonate liquor through one of a plurality of first ion exchange resins initially substantially saturated with hydrogen ions to effect interchange of cations in the waste liquor for said hydrogen ions on said one of the first resins and until multivalent cations commence to leak from said one of the first resins with the effluent therefrom; then diverting the lignosulfonate liquor from said one of the first resins and passing the same through another of said first resins initially saturated with hydrogen ions to effect interchange of cations in the waste liquor for hydrogen or said other first resin; and passing said collected ligninsulfonic acid effluent through said one of the first resins to regenerate the latter substantially simultaneously with cation exchange in said other of the first resins.

4. An ion exchange method as set forth in claim 1 wherein said steps include passing the effluent from said first resin and containing said monovalent cations through one of a plurality of second ion exchange resins initially substantially saturated with hydrogen to effect interchange of said monovalent cations in the effluent from the first resin for said hydrogen ions on said one of the second resins and until a significant proportion of multivalent cations begin to leak with said effluent from the first resin; then diverting the effluent containing said monovalent cations from said one of the second resins to another of said second resins initially saturated with hydrogen ions to effect interchange of monovalent cations in said effluent passing thereinto for hydrogen ions on said other of the second resins; and passing said solution of sulfurous acid through said one of the second resins to regenerate the latter substantially simultaneously with cation exchange in said other of the second resins.

5. An ion exchange method as set forth in claim 1 wherein said steps include addition of a quantity of sulfuric acid into said ligninsulfonic acid effluent prior to passage of the same through said first ion exchange resin to regenerate the latter.

6. An ion exchange method as set forth in claim 1 wherein a volume of backwashing lignosulfonate liquor is passed through the first ion exchange resin after the latter has been substantially exhausted of hydrogen ions, said volume being upflowed through the first resin to expand the resin and remove all deleterious solid materials which have accumulated in the same.

7. An ion exchange method as set forth in claim 1 wherein said first and second ion exchange resins are strongly acid sulfonic resins.

8. An ion exchange method as set forth in claim 1 wherein said sulfonic resin is a copolymer of styrene containing a strongly acid nuclear-sulfonic acid exchange group.

9. In an ion exchange method of treating waste lignosulfonate liquor resulting from monovalent cation sulfite pulping of wood for removing cations contained in the liquor and including the steps of passing the lignosulfonate liquor through an ion exchange resin initially substantially saturated with hydrogen ions and the cations in the lignosulfonate liquor thereby being preferentially interchanged for said hydrogen ions on the resin, the improved steps of which comprise passing a quantity of ligninsulfonic acid through the first resin upon cessation of passage of said lignosulfonate liquor therethrough to effect interchange of hydrogen ions in the ligninsulfonic acid for cations on the resin and thereby regenerating the latter.

References Cited in the file of this patent

UNITED STATES PATENTS

| | | |
|---|---|---|
| 2,413,791 | Shafor | Jan. 7, 1947 |
| 2,736,635 | Haywood | Feb. 28, 1956 |
| 2,778,714 | Kasper et al. | Jan. 22, 1957 |
| 2,785,955 | Potter et al. | Mar. 19, 1957 |

OTHER REFERENCES

Casey: "Paper and Pulp," vol. 1, pages 101–104, 1952, Interscience Publishers, N.Y., N.Y., 1952.